H. SATTLER.
TRAVEL RECORDING DEVICE.
APPLICATION FILED JAN. 16, 1919.
1,320,097.
Patented Oct. 28, 1919.
2 SHEETS—SHEET 1.
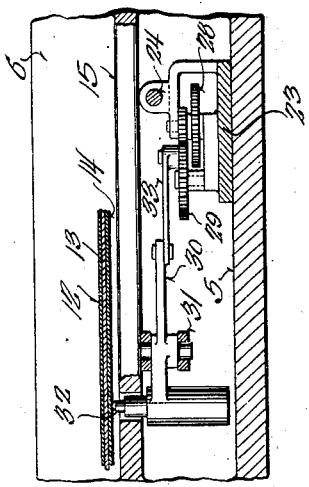
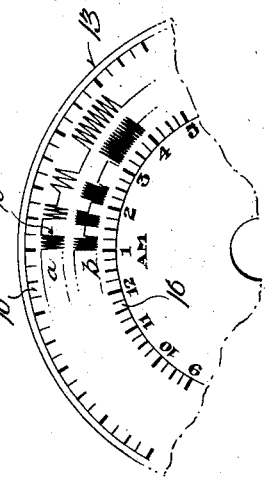
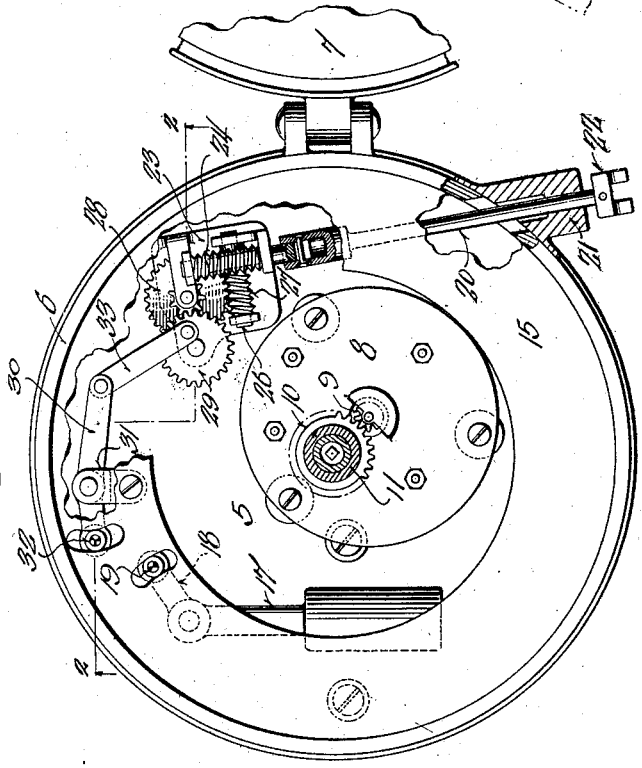
WITNESSES:
INVENTOR
Hans Sattler
BY
ATTORNEY

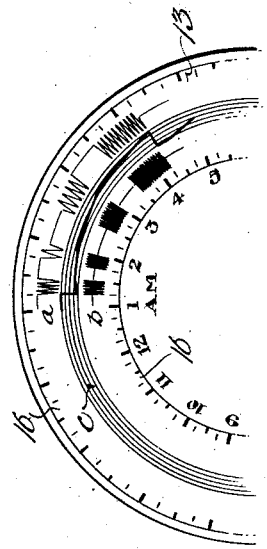
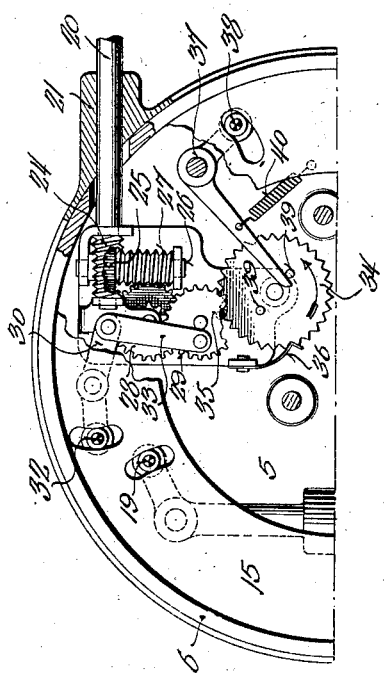

UNITED STATES PATENT OFFICE.

HANS SATTLER, OF SHEBOYGAN, WISCONSIN.

TRAVEL-RECORDING DEVICE.

1,320,097.     Specification of Letters Patent.     Patented Oct. 28, 1919.

Application filed January 16, 1919. Serial No. 271,416.

*To all whom it may concern:*

Be it known that I, HANS SATTLER, a citizen of the United States, and resident of Sheboygan, in the county of Sheboygan and State of Wisconsin, have invented certain new and useful Improvements in Travel-Recording Devices; and I do hereby declare that the following is a full, clear, and exact description thereof.

My invention relates to new and useful improvements in devices for recording various data incidental to the travel of an automobile or other vehicle to which the device is affixed, the present device being of that general type embodied in my copending application for patent filed October 21, 1918, Serial No. 256,614, wherein there is provided a clockwork mechanism for driving a record receiving dial engageable by a recording stylus.

It is the object of my invention to provide a most accurate and comprehensive record of the various conditions of travel of the vehicle, and it is more particularly an important object of my invention to provide in a structure of this type, a definite indication of the speed at which the vehicle travels.

A further object is to provide an arrangement insuring against fraud by interference with the operation of the device.

A still further object resides in the provision of an arrangement in a device of this character for recording the mileage traveled by a vehicle.

With the above and other objects and advantages in view, which will be apparent as the description proceeds, my invention resides in the novel features of construction, combination and arrangement of parts as hereinafter more particularly described and defined by the appended claims.

In the accompanying drawings:

Figure 1 is an elevational view of my improved recording device, the recording dial and other portions being broken away to more clearly show the structure of the stylus operating parts.

Fig. 2 is a sectional view taken transversely through the casing on planes indicated by the broken line 2—2 of Fig. 1.

Fig. 3 is an elevational view of a section of the recording disk.

Fig. 4 is a view similar to Fig. 1, but showing a modified structure embodying additional means for recording mileage traveled by a vehicle.

Fig. 5 is an elevational view of a modified form of recording disk adapted to record the mileage traveled by a vehicle.

Referring now more particularly to the accompanying drawings, there is provided a casing including a back wall 5 and a peripheral wall 6 at one side of which is hinged a door 7 forming the front wall of the casing and which constitutes the sole means of communication with the interior of the casing for manipulation of the mechanism therein, whereby unauthorized access to the mechanism may be prevented by providing the door with a conventional lock mechanism (not shown). A plate 8 is carried on the back casing wall 5 and mounts a clock mechanism including a drive pinion 9 meshing with a gear 10 on a sleeve 11 which carries a dial backing plate 12 on which is mounted the recording disk 13, covered in the present instance by a sheet of carbon or other transfer paper 14 engageable by the marking means of the device. The annular casing wall 6 carries an intermediate inwardly extending annular flange 15. All of this structure is shown in my said co-pending application.

The recording disk 13, which is circular in shape, is provided with concentric annular series of graduations 16 denoting time periods and corresponding to the speed of rotation of the disk by the clock mechanism. The space on the disk between the series of graduations is divided into inner and outer recording zones *a* and *b*, each adapted to receive recording markings. As in my said co-pending application, an angular pendulum lever is pivoted at its angle in the rear portion of the casing, this lever including a vertically depending weight arm 17 and a relatively short arm 18 carrying a stylus 19 extending through the flange 15 and yieldably urged to engagement with the transfer sheet 14. This stylus 19 operates in the zone *b* of the recording disk and thus, travel to which a vehicle carrying the device is subjected, will set up continuous oscillations of the pendulum lever by reason of the vibration of the vehicle part to which the device is attached, and the corresponding record effected on the recording disk 13 cannot be tampered with by any means within the power of the driver of the vehicle.

The zone $a$ of the recording disk 13 is adapted to receive a permanent record of the speed at which the vehicle travels. To procure this record, a shaft 20 is journaled in a bearing boss 21 on the annular casing wall 6, the outer end of this shaft carrying a coupling member 22 for connection with a flexible shaft line (not shown) driven from one of the wheels of the vehicle. In Figs. 1 and 2 of the drawings, this shaft 20 is formed in separable sections, and the inner end section of the shaft is journaled in bearings of a bracket plate 23 secured to the back wall 5 of the casing. The inner end of the shaft 20 carries a worm 24 which meshes with a worm gear 25 on a counter-shaft 26, which shaft also carries a worm 27 meshing with a gear wheel 28 carrying a pinion which meshes with a crank gear 29, all of these parts being journaled on the bracket plate 23 whereby they form a unit for insertion in the casing. A stylus lever 30 is intermediately pivoted to the bracket 31 secured to the rear face of the casing flange 15, and one end of this lever carries a stylus 32 projecting through the flange 15 and operating against the recording disk 31 in the outer zone $a$ thereof. The other end of the lever 30 is connected by a pitman link 33 with the crank wheel 29 whereby as the vehicle travels, the lever will be oscillated to procure oscillatory markings in the zone $a$ of the recording disk.

The gear reductions of the various drive members for the stylus lever 30 are such that one complete stroke or oscillation of the lever corresponds to a predetermined distance which the vehicle travels. Hence, bearing in mind the even rotation of the recording disk by the clock mechanism, it is apparent that a certain number of recorded oscillations of the stylus 32 will indicate the speed at which the vehicle is driven and will indicate the duration of such speed. For instance, assuming that one oscillatory movement of the stylus 32 corresponds to a mile traveled by the vehicle, it is noted that on the portion marked X of the recording disk that eight oscillations of the stylus are recorded with a quarter hour period of time, thus indicating that the vehicle was driven at a speed of approximately 32 miles per hour for a quarter of an hour.

Various recording devices have been contemplated for the purpose of recording running time and speed of a vehicle, but all such devices heretofore contemplated and dependent upon connection with one of the traveling parts of the vehicle have been open to serious objection by reason of the fact that it is practically impossible to prevent the driver when he so desires, from disconnecting the device and using the vehicle for unauthorized travel. In my device, I utilize the recording parts which are connected with a driven portion of the vehicle solely as a means for indicating the speed, and for an absolutely reliable record of running time, I depend upon the stylus carrying lever 17 which is responsive to any travel vibrations of the vehicle and which is locked within the recording casing in such manner that it cannot be tampered with.

In Figs. 4 and 5, I show an additional recording mechanism for recording the total mileage traveled by a vehicle. To accommodate this additional recording, the disk 13 is provided with an intermediate zone divided by concentric circular lines into regular annular sections. To effect this recording, a wheel 34 is journaled on the bracket plate 23 and has its periphery toothed for engagement of a pin 35 carried by the crank wheel 29, to rotate the wheel 34 one step upon each complete rotation of the wheel 29, excess rotation of the wheel 34 being prevented by a leaf spring 36 yieldably urged against its toothed periphery. An angular stylus lever 37 is pivoted in the casing, one arm carrying a stylus 38 projecting through the flange 15 and engaging the transfer sheet 14. The other arm of the lever 37 is projected across the face of the wheel 34 and is successively engageable by diametrically opposed outstanding pins 39 on the face of the wheel, the lever being urged for such engagement by a spring 40 secured thereto and to the casing flange.

Thus, upon each complete rotation of the wheel 34, in accordance with travel of the vehicle a predetermined distance, the lever 37 will be twice reciprocated by the pins 39. It is noted that as each pin 39 releases the lever 37 at its limit of rocking movement of the lever, the lever will shift immediately under influence of the spring 40 for engagement on the other pin 39, thus producing a radial line within the zone $c$ of the recording disk. As the succeeding pin 39 rocks the lever, a line will be drawn diagonally in the zone $c$, the angularity of the line depending upon the speed of travel. Thus the number of radial lines drawn on the recording disk afford a convenient basis of computing the total number of miles traveled, and the diagonal lines described during rocking movement of the lever 37 indicate intermediate distance units by their intersection with the dividing lines of the zone $c$.

What is claimed is:

1. A recording device including a casing, a driven recording member in the casing, means including a shaft extending outwardly of the casing for recording on said recording member the speed of travel of a vehicle to which the device is attached, and means located wholly within the casing and responsive solely to vibrations of the vehicle for recording on said recording member travel of the vehicle.

2. A device of the class described including a clock driven recording member, a pivoted lever, a stylus carried by the lever for marking said recording member, a reducing train of gears adapted for connection with a driven member to be recorded, means connecting the lever and said train of gears whereby said stylus is adapted to record speed of travel, and a second stylus for marking the recording member connected with the operating train of the first stylus for operation at a fractional speed of the first stylus whereby to record mileage.

3. A device of the class described including a clock driven recording member, a lever, a stylus connected with said lever for marking said recording member, a reducing train of gears adapted for connection with a driven member to be recorded, and terminating in a wheel, a plurality of pins on the wheel engageable with a portion of the lever, and means for urging said portion of the lever toward the pins, said pins being movable past the end of the lever upon rotation of the wheel to permit abrupt movements of the lever.

In testimony that I claim the foregoing I have hereunto set my hand at Sheboygan, in the county of Sheboygan and State of Wisconsin.

HANS SATTLER.